US 10,935,874 B2

(12) United States Patent
Lin et al.

(10) Patent No.: US 10,935,874 B2
(45) Date of Patent: Mar. 2, 2021

(54) ILLUMINATION SYSTEM AND PROJECTION DEVICE

(71) Applicant: Coretronic Corporation, Hsin-Chu (TW)

(72) Inventors: Yao-Shun Lin, Hsin-Chu (TW); Haw-Woei Pan, Hsin-Chu (TW); Chi-Tang Hsieh, Hsin-Chu (TW); Chien-Chung Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/683,273

(22) Filed: Nov. 14, 2019

(65) Prior Publication Data

US 2020/0166826 A1 May 28, 2020

(30) Foreign Application Priority Data

Nov. 23, 2018 (CN) .......................... 201811406205.4

(51) Int. Cl.
*G03B 21/20* (2006.01)
*G03B 21/00* (2006.01)

(52) U.S. Cl.
CPC ....... *G03B 21/005* (2013.01); *G03B 21/2033* (2013.01); *G03B 21/2073* (2013.01); *G03B 21/2053* (2013.01)

(58) Field of Classification Search
CPC .. G03B 21/005; G03B 21/006; G03B 21/008; G03B 21/28; G03B 21/2013; G03B 21/2033; G03B 21/2053; G03B 21/2073; H04N 9/3164; H04N 9/3167; G02B 27/0068; G02B 27/48; G02B 27/286
See application file for complete search history.

(56) References Cited

U.S. PATENT DOCUMENTS 8,408,708 B2 *  4/2013  Sharp ................... H04N 13/363
                                                    353/7
2016/0119595 A1 *  4/2016  Lyubarsky ........... G02B 27/145
                                                    353/20

FOREIGN PATENT DOCUMENTS

CN          1987552       6/2007
CN        101126889       2/2008

* cited by examiner

*Primary Examiner* — Sultan Chowdhury
(74) *Attorney, Agent, or Firm* — JCIPRNET (57) ABSTRACT

An illumination system and a projection device are provided. The illumination system includes at least one laser light source providing at least one laser beam and a polarizing rotation module including a first axle, a first driving element, and a polarizing element. The first axle has a first revolution frequency. The polarizing element is disposed on a transmission path of the laser beam. The first driving element causes the polarizing element to rotate in a temporally sequenced manner. When the polarizing element is rotated, the laser beam is transmitted to the polarizing element at a specific frequency in a plurality of first time periods. The laser beam passing through the polarizing element has different polarizing states at different times. The specific frequency and the first revolution frequency of the first axle are not exactly divisible by each other. The invention can generate an image with uniform polarizing direction.

26 Claims, 7 Drawing Sheets

ILLUMINATION SYSTEM AND PROJECTION DEVICE

CROSS-REFERENCE TO RELATED APPLICATION

This application claims the priority benefit of China application serial no. 201811406205.4, filed on Nov. 23, 2018. The entirety of the above-mentioned patent application is hereby incorporated by reference herein and made a part of this specification.

BACKGROUND OF THE INVENTION

Field of the Invention

The disclosure relates to an illumination system and a projection device, and in particular, to an illumination system and a projection device including a polarizing element.

Description of Related Art

As a display device adapted to generate a large-size image, the projection device has been constantly improved as technology advances and innovates. The principle of imaging of the projection device involves converting an illumination beam generated by the illumination system into an image beam through a light valve, and then projecting the image beam through a projection lens onto a projection target (e.g., a screen or a wall) to form a projection image.

Moreover, in response to the market demands for the brightness, the color saturation, the lifetime of the projection device and non-toxicity and environmental-friendliness, the illumination system has evolved from using the ultra-high-performance lamp (UHP lamp), the light-emitting diode (LED), to the most recent laser diode (LD) as the light source. However, in the illumination system, the more economical method for generating red-green light currently involves using a blue laser diode to excite the phosphor powder of the phosphor wheel to generate yellow-green light, and then filtering out the desired red light or green light through the optical element for further use.

However, since the laser is a light source having one single polarizing direction, in the known illumination system framework, after entering the projection device, the polarity of laser is damaged by the optical element inside the projection device, so that the polarizing direction of the laser in different regions of the projection screen becomes inconsistent. Therefore, when applied to a display image of a 3D image, the configuration of the polarizing plate in front of the lens of the projection device retains beams of specific polarizing directions, so that the image viewed by the user through 3D glasses exhibits serious disuniformity in color and brightness.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides an illumination system that provides an illumination beam for displaying excellent image quality.

The invention provides a projection device that exhibits excellent image quality.

Other purposes and advantages of the embodiments of the invention may be further understood according to the technical features disclosed herein.

To achieve one, part, or all of the foregoing purposes or other purposes, an embodiment of the invention provides an illumination system configured to provide an illumination beam. The illumination system includes at least one laser light source and a polarizing rotation module. The at least one laser light source is configured to provide at least one laser beam. The polarizing rotation module includes a first axle, a first driving element, and a polarizing element. The first axle has a first revolution frequency. The first driving element is configured to drive the first axle to rotate. The polarizing element is connected to the first axle and is disposed on a transmission path of the at least one laser beam. The first driving element is configured to cause the polarizing element to rotate in a temporally sequenced manner with the first axle as a rotation central axis. When the polarizing element is rotated, the at least one laser beam is transmitted to the polarizing element at a specific frequency in a plurality of first time periods. The first time periods are separated from each other by a plurality of first time intervals. The at least one laser beam passing through the polarizing element has different polarizing states at different times, and the specific frequency and the first revolution frequency of the first axle are not exactly divisible by each other.

To achieve one, part, or all of the foregoing purposes or other purposes, an embodiment of the invention provides a projection device including the above illumination system, at least one light valve, and a projection lens. The light valve is located on a transmission path of the illumination beam and is configured to convert the illumination beam into an image beam. The projection lens is located on a transmission path of the image beam and is configured to convert the image beam into a projection beam.

To achieve one, part, or all of the foregoing purposes or other purposes, an embodiment of the invention provides an illumination system configured to provide an illumination beam. The illumination system includes at least one laser light source, a polarizing rotation module, and a filtering module. The at least one laser light source is configured to provide at least one laser beam. The polarizing rotation module includes a first axle, a first driving element, and a polarizing element. The first axle has a first revolution frequency. The first driving element is configured to drive the first axle to rotate. The polarizing element is connected to the first axle and is disposed on a transmission path of the at least one laser beam. The first driving element is configured to cause the polarizing element to rotate in a temporally sequenced manner with the first axle as a rotation central axis. The filtering module includes a second axle, a second driving element, and a filtering substrate. The second axle has a second revolution frequency. The second driving element is configured to drive the second axle to rotate. The filtering substrate is connected to the second axle and is disposed on the transmission path of the at least one laser beam. The second driving element is configured to cause the filtering substrate to rotate in a temporally sequenced manner with the second axle as a rotation central axis. The first revolution frequency of the first axle of the polarizing rotation module and the second revolution frequency of the second axle of the filtering module are not exactly divisible by each other.

Based on the above, the embodiments of the invention at least exhibit one of the advantages or effects below. In the embodiments of the invention, in the projection device and the illumination system, by setting the relative relationships between the first revolution frequency of the first axle of the polarizing rotation module and the specific frequency, the second revolution frequency of the second axle of the filtering module, and the frame rate of the light valve, the laser beam and the auxiliary beam can be incident on non-specific corresponding regions of the polarizing element to fully cover the polarizing directions as much as possible. As a result, the invention can generate an image with uniform polarizing direction. In this way, even in the case where the projection beams provided by two projection devices pass through the polarizing plate in the front, an image having uniform coloration and brightness can be generated to allow the user to observe a 3D display image having improved uniformity through polarized 3D glasses.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
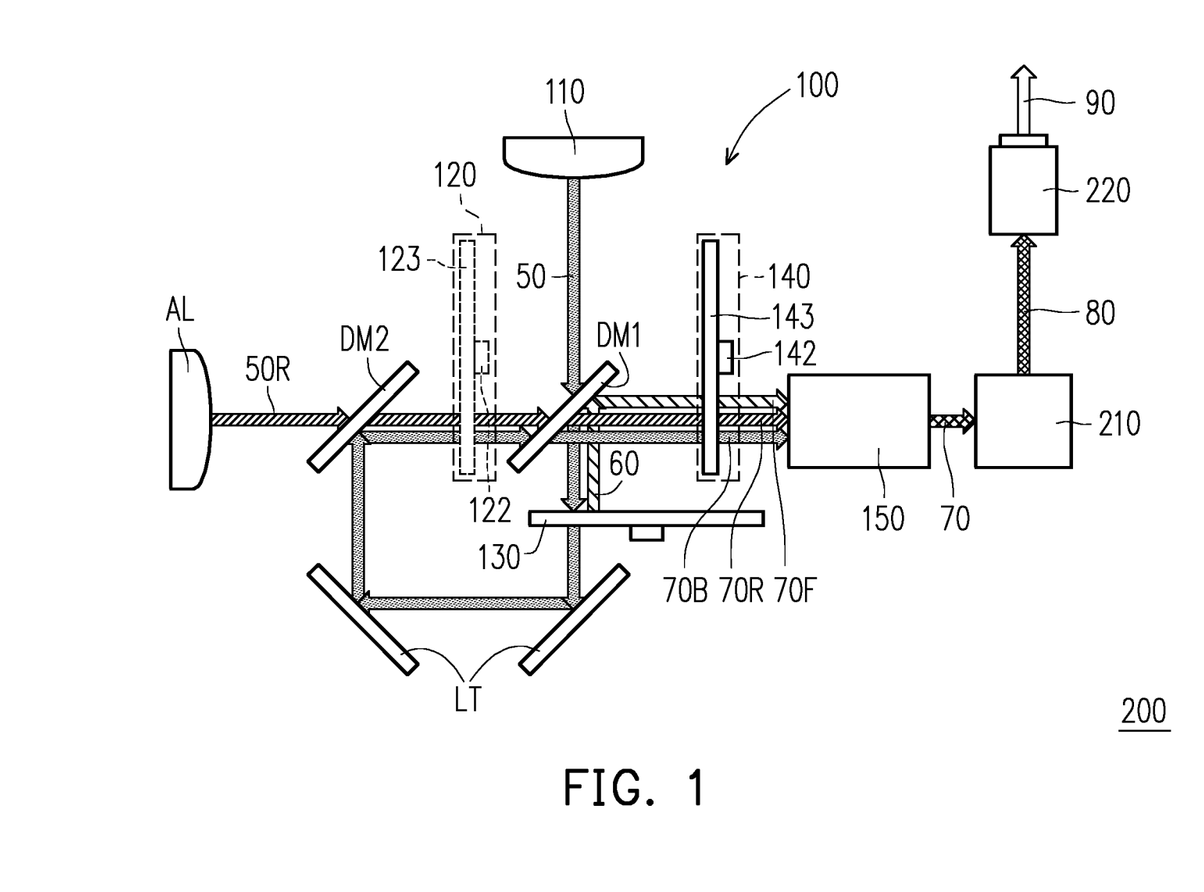
FIG. 1 is a schematic framework diagram illustrating a projection device according to an embodiment of the invention.
Figure 2A:
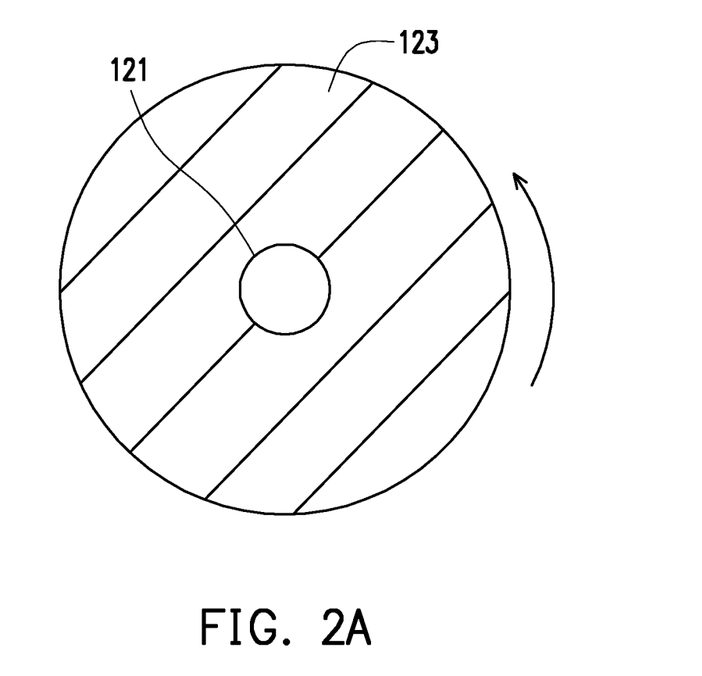
FIG. 2A is a schematic framework diagram illustrating a polarizing rotation module of FIG. 1.
Figure 2B:
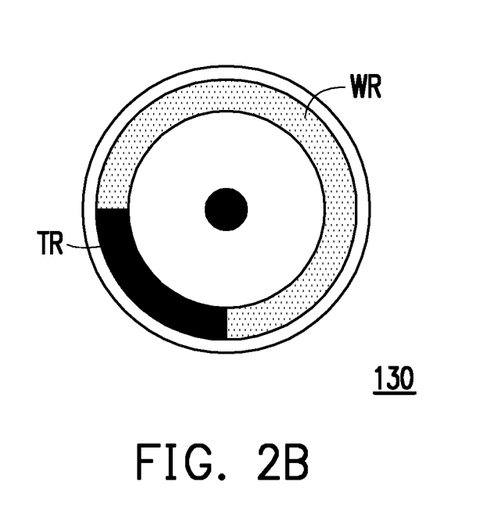
FIG. 2B is a schematic framework diagram illustrating a wavelength conversion module of FIG. 1.
Figure 2C:
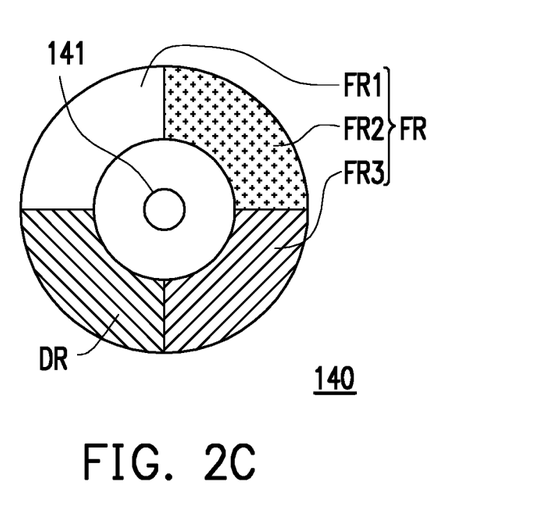
FIG. 2C is a schematic framework diagram illustrating a filtering module of FIG. 1.

FIG. 1 is a schematic framework diagram illustrating a projection device according to an embodiment of the invention. FIG. 2A is a schematic framework diagram illustrating a polarizing rotation module of FIG. 1. FIG. 2B is a schematic framework diagram illustrating a wavelength conversion module of FIG. 1. FIG. 2C is a schematic framework diagram illustrating a filtering module of FIG. 1. Referring to FIG. 1, in the present embodiment, a projection device 200 includes an illumination system 100, at least one light valve 210, and a projection lens 220. For example, in the present embodiment, the light valve 210 may be a reflective light modulator such as a digital micro-mirror device (DMD), a liquid crystal on silicon panel (LCoS panel), etc. In some embodiments, the light valve 210 may also be a transmissive light modulator such as a transparent liquid crystal panel, an electro-optical modulator, a magneto-optic modulator, an acousto-optic modulator (AOM), etc. The form and type of the light valve 210 are not limited herein. Moreover, in the present embodiment, as an example, the number of the light valve 210 is one. In other words, the projection device 200 is, for example, a projection device that uses one single digital micro-mirror device (DMD). However, in other embodiments, the number of the light valve 210 may be plural, and the invention is not limited thereto.

Specifically, as shown in FIG. 1, the illumination system 100 is adapted to provide an illumination beam 70. The illumination system 100 includes at least one laser light source 110, an auxiliary light source AL, a polarizing rotation module 120, a first dichroic element DM1, a light transmission module LT, a wavelength conversion module 130, and a filtering module 140. The at least one laser light source 110 is adapted to provide at least one laser beam 50, and the auxiliary light source AL provides an auxiliary beam 50R. For example, in the present embodiment, the laser light source 110 is a blue laser light source, and the auxiliary light source AL is a red laser light source. In other words, the laser beam 50 is a blue laser beam, and the auxiliary beam 50R is a red laser beam. The laser light source 110 may include, for example, a plurality of blue laser diodes arranged in an array, and the auxiliary light source AL may include, for example, a plurality of red laser diodes (not shown) arranged in an array, but the invention is not limited thereto.

Specifically, as shown in FIG. 1, in the present embodiment, the first dichroic element DM1 is disposed on the transmission path of the laser beam 50 and is located between the laser light source 110 and the wavelength conversion module 130. For example, in the present embodiment, the first dichroic element DM1 may be a dichroic mirror having a function of reflecting green light and orange light and can allow blue light and red light to pass through and reflect green light and orange light. Therefore, the first dichroic element DM1 allows the blue laser beam 50 to pass through, so that the laser beam 50 of the laser light source 110 can pass through the first dichroic element DM1 to be transmitted to the wavelength conversion module 130.

More specifically, as shown in FIG. 1, in the present embodiment, the wavelength conversion module 130 is located on the transmission path of the laser beam 50. Moreover, as shown in FIG. 2B, at least one wavelength conversion region WR of the wavelength conversion module 130 is adapted to convert the laser beam 50 into at least one wavelength conversion beam 60. A non-conversion region TR of the wavelength conversion module 130 is adapted to allow the laser beam 50 to pass through to be transmitted to a subsequent optical element. Specifically, as shown in FIG. 1 and FIG. 2B, in the present embodiment, when the non-conversion region TR of the wavelength conversion module 130 enters the irradiation range of the laser beam 50, the laser beam 50 passes through the non-conversion region TR of the wavelength conversion module 130 and is transmitted to the polarizing rotation module 120 via the light transmission module LT. On the other hand, in the present embodiment, when the at least one wavelength conversion region WR enters the irradiation range of the laser beam 50, the laser beam 50 is converted into the at least one wavelength conversion beam 60 and reflected by the at least one wavelength conversion region WR. Afterwards, as shown in FIG. 1, the at least one wavelength conversion beam 60 from the wavelength conversion module 130 can be guided to the first dichroic element DM1 and reflected to the filtering module 140.

On the other hand, the light transmission module LT of the illumination system 100 includes a second dichroic element DM2 located on the transmission paths of the laser beam 50 and the auxiliary beam 50R. In the present embodiment, the second dichroic element DM2 may be, for example, a dichroic mirror having a function of reflecting blue light and can allow red light to pass through and reflect blue light. Accordingly, the auxiliary beam 50R of the auxiliary light source AL can pass through the second dichroic element DM2 to be transmitted to the first dichroic element DM1, and the laser beam 50 can also be transmitted to the first dichroic element DM1 via the light transmission module LT.

More specifically, as shown in FIG. 1 and FIG. 2A, in the present embodiment, the polarizing rotation module 120 is located on the transmission paths of the laser beam 50 and the auxiliary beam 50R and is disposed between the at least one laser light source 110 and the filtering module 140. The polarizing rotation module 120 includes a first axle 121, a first driving element 122, and a polarizing element 123. For example, in the present embodiment, the polarizing element 123 may be a half-wave plate, a quarter-wave plate, a depolarizing plate, or a circular polarizing plate. In other embodiments, the polarizing rotation module 120 is located on the transmission paths of the laser beam 50 and the auxiliary beam 50R, and the filtering module 140 is disposed between the at least one laser light source 110 and the polarizing rotation module 120.

Specifically, as shown in FIG. 1 and FIG. 2A, in the present embodiment, the first driving element 122 may be configured to drive the first axle 121 to rotate, so that the first axle 121 has a first revolution frequency. More specifically, as shown in FIG. 1 and FIG. 2A, in the present embodiment, the polarizing element 123 is connected to the first axle 121 and is disposed on the transmission paths of the at least one laser beam 50 and the auxiliary beam 50R. The first driving element 122 is configured to cause the polarizing element 123 to rotate in a temporally sequenced manner with the first axle 121 as a rotation central axis.

For example, as shown in FIG. 1 and FIG. 2A, in the present embodiment, the first driving element 122 may be a motor connected to the first axle 121 to drive the first axle 121 to rotate. At this time, the at least one laser beam 50 and the auxiliary beam 50R pass through a non-center portion (e.g., the side peripheral region) of the polarizing element 123, but the invention is not limited thereto. In another unillustrated embodiment, the first driving element 122 may also be a driving assembly that clamps around the polarizing element 123 and causes the first axle 121 to rotate. At this time, the at least one laser beam 50 and the auxiliary beam 50R pass through a region including the center of the polarizing element 123.

Accordingly, the laser beam 50 and the auxiliary beam 50R are lights having polarity (polarization) (e.g., linearly polarized lights), and after they pass through the polarizing element 123, their polarizing states change according to the type of the polarizing element 123. Therefore, when the polarizing element 123 is rotated, the laser beam 50 and the auxiliary beam 50R pass through the polarizing element 123, and the laser beam 50 and the auxiliary beam 50R passing through the polarizing element 123 have different polarizing states at different times. In other words, when the illumination system 100 is operated, the laser beam 50 and the auxiliary beam 50R are rapidly and constantly switched to form emission lights having different polarizing directions through rotation of the polarizing rotation module 120.

Next, as shown in FIG. 1, in the present embodiment, the laser beam 50 and the auxiliary beam 50R having passed through the polarizing rotation module 120, and the at least one wavelength conversion beam 60 from the wavelength conversion module 130 are all transmitted to the first dichroic element DM1, and the first dichroic element DM1 allows the laser beam 50 and the auxiliary beam 50R to pass through and reflects the at least one wavelength conversion beam 60 to guide the laser beam 50, the auxiliary beam 50R, and the at least one wavelength conversion beam 60 to the filtering module 140.

Specifically, as shown in FIG. 1 and FIG. 2C, in the present embodiment, the filtering module 140 is located on the transmission paths of the laser beam 50, the auxiliary beam 50R, and the at least one wavelength conversion beam 60 and has at least one filtering region FR and a blue light filtering region DR. In the present embodiment, the filtering region FR is adapted to filter the at least one wavelength conversion beam 60 (filtering out the undesired wavelength band and allowing the desired wavelength band to pass through) into at least one filtering beam 70F, and the blue light filtering region DR is adapted to form the laser beam 50 into a first color light 70B. For example, in the present embodiment, the number of the filtering region FR is three, including a filtering region FR1, a filtering region FR2, and a filtering region FR3, and can correspondingly filter the at least one wavelength conversion beam 60 and the auxiliary beam 50R into filtering beams 70F having different colors, but the invention is not limited thereto.

Moreover, as shown in FIG. 1 and FIG. 2C, in the present embodiment, the filtering module 140 includes a second axle 141, a second driving element 142, and a filtering substrate 143. The second axle 141 has a second revolution frequency. The second driving element 142 is configured to drive the second axle 141 to rotate. The filtering substrate 143 is connected to the second axle 141. The second driving element 142 is configured to cause the filtering substrate 143 to rotate in a temporally sequenced manner with the second axle 141 as a rotation central axis. Accordingly, when the filtering substrate 143 of the filtering module 140 is rotated, the laser beam 50 can correspondingly enter the blue light filtering region DR of the filtering module 140 at different times to form the first color light 70B. On the other hand, the at least one wavelength conversion beam 60 also correspondingly enters the filtering region FR1 and the filtering region FR3 at different times, and the at least one wavelength conversion beam 60 can be correspondingly filtered into the filtering beams 70F having different colors. Or the auxiliary beam 50R correspondingly enters the filtering region FR2 at different times and is filtered into a second color light 70R. The first color light 70B (e.g., blue light), the second color light (e.g., red light), and the filtering beams 70F (e.g., orange light and green light) form the illumination beam 70 of the illumination system 100.

Next, as shown in FIG. 1, in the present embodiment, a light homogenizing element 150 is located on the transmission path of the illumination beam 70. In the present embodiment, the light homogenizing element 150 includes an integrator rod, but the invention is not limited thereto. More specifically, as shown in FIG. 1, when the illumination beam 70 is transmitted to the light homogenizing element 150, the light homogenizing element 150 homogenizes the illumination beam 70 and transmits it to the light valve 210.

Next, as shown in FIG. 1, the light valve 210 is located on the transmission path of the illumination beam 70 from the illumination system 100 and is adapted to convert the illumination beam 70 into an image beam 80. The projection lens 220 is located on the transmission path of the image beam 80 and is adapted to allow the image beam 80 to pass through to form a projection beam 90 to project the projection beam 90 onto a screen to form an image. After the illumination beam 70 is irradiated on the light valve 210, the light valve 210 projects the illumination beam 70 as the image beam 80 having different colors according to the time sequence to be transmitted to the projection lens 220. Therefore, the image formed by projection of the image beam 80 converted by the light valve 210 can be a colored image.

Figure 2D:
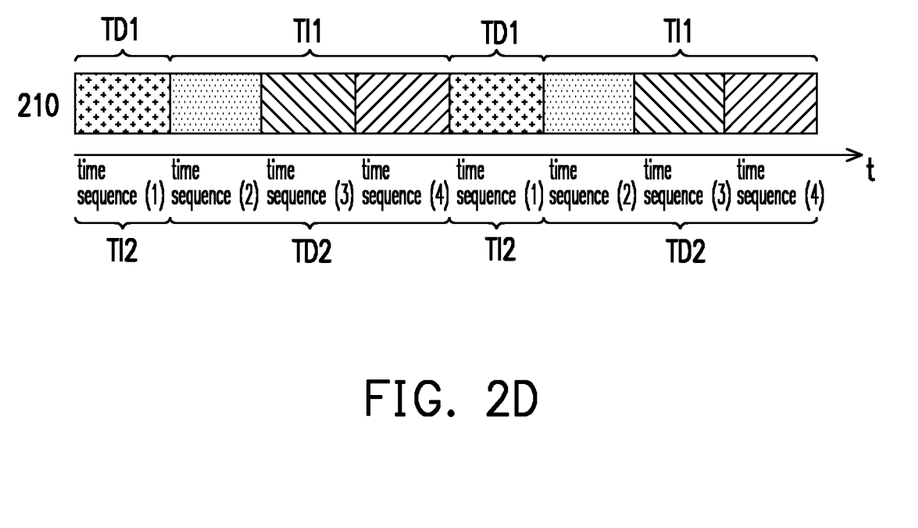
FIG. 2D is a schematic time sequence diagram of the illumination beam entering the light valve of FIG. 1 in different time periods.

FIG. 2D is a schematic time sequence diagram of the illumination beam entering the light valve of FIG. 1 in different time periods. As shown in FIG. 2D, in the present embodiment, since the number of the light valve 210 is one, the different colors of the image beam 80 output by the light valve 210 are formed by inputting the first color light 70B, the second color light 70R, and the filtering beams 70F having different colors according to the time sequence. Therefore, the first color light 70B, the second color light 70R, and the filtering beams 70F, and the laser beam 50 and the auxiliary beam 50R that form the first color light 70B, the second color light 70R, and the filtering beams 70F, need to be provided in corresponding time periods, so that the desired image beam 80 can be formed according to the time sequence. In other words, the frequency at which the laser light source 110 of the illumination system 100 provides the laser beam 50 or the frequency at which the auxiliary light source AL provides the auxiliary beam 50R, and the second revolution frequency of the second axle 141 of the filtering module 140 have to be synchronized with the frame rate of the light valve 210, so that the light valve 210 can form the desired image beam 80.

For example, in the present embodiment, the laser beam 50 passes through the non-conversion region TR of the wavelength conversion module 130 in different time periods to be transmitted to the polarizing rotation module 120 via the light transmission module LT. Therefore, the at least one laser beam 50 passes through the polarizing element 123 at a specific frequency in a plurality of first time periods TI1. In other words, in the first time periods TI1, the at least one laser beam 50 is in the on-state, and the first time periods TI1 are separated from each other by a plurality of first time intervals TD1. On the other hand, the auxiliary light source AL also provides the auxiliary beam 50R at the specific frequency in a plurality of second time periods TI2. In other words, in the second time periods TI2, the auxiliary light source AL is in the on-state, and the second time periods TI2 are separated from each other by a plurality of second time intervals TD2. The second time interval TD2 is the time length of the first time period TI1, and the first time interval TD1 is the time length of the second time period TI2. Accordingly, the second time periods TI2 and the first time periods TI1 do not temporally overlap with each other. Moreover, the illumination system 100 may cause the light valve 210 to form intervals of the image beam 80 having different colors as shown in FIG. 2D in different time periods by adjusting the time lengths of the first time periods TI1 and the second time periods TI2.

However, as a result, the laser beam 50 and the auxiliary beam 50R also pass through the polarizing rotation module 120 in an on-off-on-off manner as in the case of a pulse. At this time, if the polarizing rotation module 120 and the second revolution frequency of the filtering module 140 are consistent (synchronized) or are an integer multiple of each other, then the laser beam 50 and the auxiliary beam 50R are incident on specific corresponding regions of the polarizing element 123 in different time periods and can only be converted into laser beams having polarizing directions of specific ranges and then emitted, rather than fully covering all polarizing directions. As a result, the polarizing state of the image beam 80 on the projection screen cannot be uniformly distributed as expected (i.e., the polarizing directions are extremely disordered). Therefore, when applied to a display image of a 3D image, the configuration of the polarizing plate in front of the lens of the projection device 200 retains beams of specific polarizing directions, so that the image viewed by the user though 3D glasses exhibits disuniformity in color and brightness.

Accordingly, in the present embodiment, the first revolution frequency of the first axle 121 of the polarizing rotation module 120 and the second revolution frequency of the second axle 141 of the filtering module 140 are configured not to be exactly divisible by each other. This also means that the first revolution frequency of the first axle 121 of the polarizing rotation module 120 and the specific frequency (or the frame rate of the light valve 210) are not exactly divisible by each other. As a result, the rotational speed of the polarizing rotation module 120 can cause the laser beam 50 and the auxiliary beam 50R to be incident on non-specific corresponding regions of the polarizing element 123 to fully cover all the polarizing directions as much as possible. Accordingly, the present embodiment can generate an image in which the polarizing direction is uniform. Even in the case where the projection beams 90 provided by two projection devices 200 pass through the polarizing plate (not shown) in the front, an image having uniform coloration and brightness can be generated to allow the user to observe a 3D display image having improved uniformity through polarized 3D glasses.

Further description in this regard will be provided with reference to the concept of coverage ratio.

For example, in the present embodiment, one filtering region FR of the filtering module 140 corresponds to at least one polarizing sub-region (not shown) of the polarizing element 123. The correspondence between this filtering region FR and the corresponding polarizing sub-region is derived from the following: When the polarizing element 123 and the filtering substrate 143 are rotated, the at least one laser beam 50 or the auxiliary beam 50R transmitted to the filtering module 140 passes through a specific region (i.e., the at least one polarizing sub-region) of the polarizing element 123 first, and the angle ratio occupied by the polarizing sub-regions on the polarizing element 123 are the so-called "coverage ratio". As the coverage ratio increases, the non-specific corresponding regions of the polarizing element 123 on which the laser beam 50 and the auxiliary beam 50R are incident become broader, and the polarizing directions can be more fully covered. In theory, as the highest common factor between the first revolution frequency of the first axle 121 of the polarizing rotation module 120 and the second revolution frequency of the second axle 141 of the filtering module 140 decreases (i.e., as the least common multiple increases), the coverage ratio will increase. In the present embodiment, the value range of this coverage ratio is preferably greater than 20%.

On the other hand, since the polarizing element 123 of the polarizing rotation module 120 is symmetrical, the polarizing directions of two regions having the same opposite angles will be identical. Therefore, in the present embodiment, the half of the second revolution frequency of the second axle 141 of the filtering module 140 is preferably configured to be unable to exactly divide the first revolution frequency of the first axle 121 of the polarizing rotation module 120, or the half of the first revolution frequency of the first axle 121 of the polarizing rotation module 120 is configured to be unable to exactly divide the second revolution frequency of the second axle 141 of the filtering module 140. This also means that the half of the specific frequency (or the half of the frame rate of the light valve 210) is configured to be unable to exactly divide the first revolution frequency of the first axle 121, or the half of the first revolution frequency of the first axle 121 is configured to be unable to exactly divide the specific frequency (or the frame rate of the light valve 210). As a result, the rotational speed of the polarizing rotation module 120 can cause the laser beam 50 and the auxiliary beam 50R to be incident on the non-specific corresponding regions of the polarizing element 123 to fully cover all the polarizing directions as much as possible. Accordingly, the user can observe a 3D display image having improved uniformity through polarized 3D glasses.

On the other hand, the operating principle of scrambling the polarity of the laser beam 50 and the auxiliary beam 50R in the illumination system 100 involves rapidly rotating the polarizing rotation module 120 to rapidly change the polarizing direction of the laser beam 50 and the auxiliary beam 50R passing through the polarizing element 123 of the polarizing rotation module 120. Therefore, if the rotational speed of the polarizing rotation module 120 is overly low (e.g., lower than 30 Hz, which is recognizable by the human eye), the human eye will experience image flicker. Accordingly, in the present embodiment, the first revolution frequency of the first axle 121 of the polarizing rotation module 120 has to be set to be greater than or equal to 30 Hz, i.e., greater than or equal to 1800 rpm (revolution per minute). Moreover, since the frequency recognizable by the human eye varies from person to person, to ensure that most people (≥95%) do not feel image flicker, the first revolution frequency of the first axle 121 of the polarizing rotation module 120 is preferably set to be greater than or equal to 60 Hz, i.e., greater than or equal to 3600 rpm.

Figure 2E:
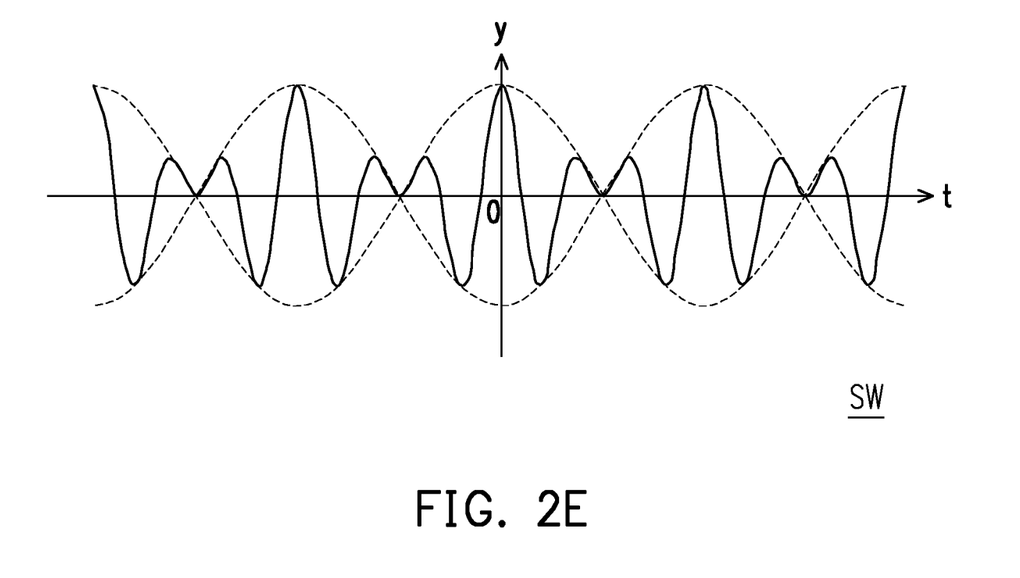
FIG. 2E is a schematic light wave frequency diagram of the illumination beam of FIG. 1.

FIG. 2E is a schematic light wave frequency diagram of the illumination beam 70 of FIG. 1. On the other hand, as shown in FIG. 2E, in the present embodiment, since the polarizing rotation module 120 and the filtering module 140 are respectively rotated at different rotational speeds, after the laser beam 50 and the auxiliary beam 50R are modulated with the first revolution frequency of the first axle 121 of the polarizing rotation module 120 and the second revolution frequency of the second axle 141 of the filtering module 140, a signal of a synthesized wave SW having both a high frequency and a low frequency is generated (i.e., beat frequency phenomenon). If the frequency of the low frequency (e.g., the waveform in broken lines as shown in FIG. 2E) in the synthesized wave SW is overly low, it is also perceivable to the human eye, and the flicker phenomenon occurs. According to the beat frequency formula, the value of the low frequency is the half of the difference between the first revolution frequency and the second revolution frequency. Therefore, to eliminate the flicker phenomenon, the difference between the first revolution frequency and the second revolution frequency has to be set to be greater than or equal to 10 Hz, i.e., greater than or equal to 600 rpm. This also means that the difference between the specific frequency and the first revolution frequency is set to be greater than or equal to 10 Hz. Accordingly, the flicker in the image generated by the projection beam 90 can be controlled to be within the range unperceivable to the human eye.

Based on the above, in the projection device 200 and the illumination system 100, by setting the relative relationships between the first revolution frequency of the first axle 121 of the polarizing rotation module 120 and the specific frequency, the second revolution frequency of the second axle 141 of the filtering module 140, and the frame rate of the light valve 210, the laser beam 50 and the auxiliary beam 50R can be incident on the non-specific corresponding regions of the polarizing element 123 to fully cover the polarizing directions as much as possible. As a result, the invention can generate an image with uniform the polarizing direction. In this way, even in the case where the projection beams 90 provided by two projection devices 200 pass through the polarizing plate in the front, an image having uniform coloration and brightness can be generated to allow the user to observe a 3D display image having improved uniformity through polarized 3D glasses.

Figure 3:
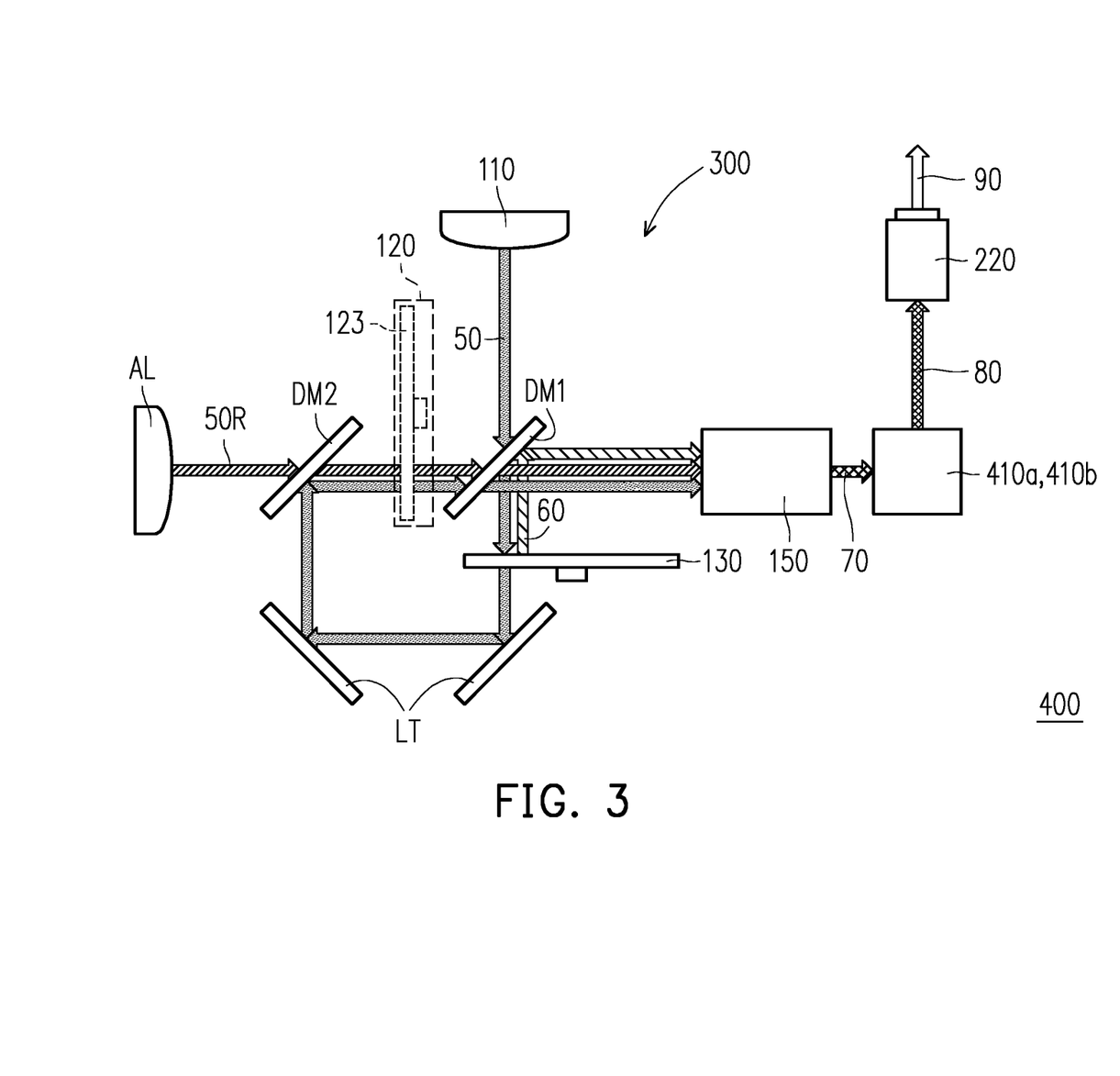
FIG. 3 is a schematic framework diagram illustrating another projection device according to an embodiment of the invention.
Figure 4:
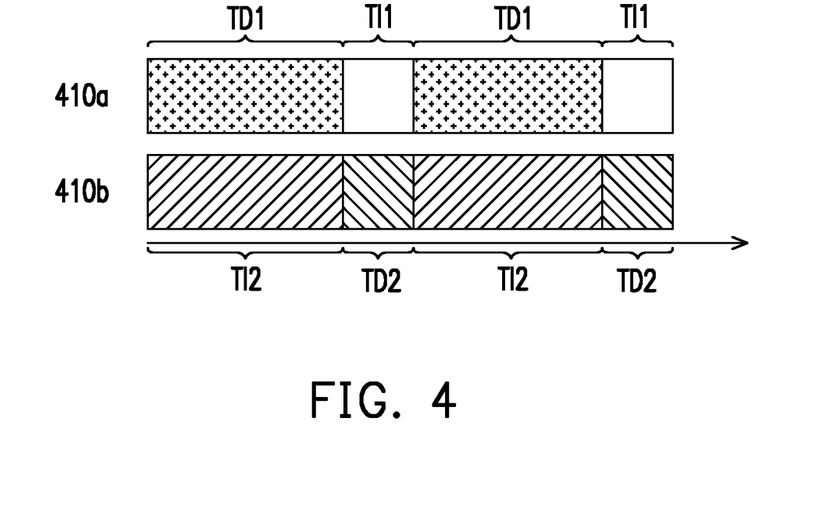
FIG. 4 is a schematic time sequence diagram of the illumination beam entering the light valve of FIG. 3 in different time periods.

FIG. 3 is a schematic framework diagram illustrating another projection device according to an embodiment of the invention. FIG. 4 is a schematic time sequence diagram of the illumination beam entering the light valve of FIG. 3 in different time periods. Referring to FIG. 3 and FIG. 4, an illumination system 300 and a projection device 400 of the present embodiment are similar to the illumination system 100 and the projection device 200 of FIG. 1, and the difference therebetween is as described below. In the present embodiment, the projection device 400 is, for example, a projection device that uses two digital micro-mirror devices (2-DMD) as the light valve. Therefore, the configuration of the filtering module 140 may be omitted from the illumination system 300. As shown in FIG. 3 and FIG. 4, in the present embodiment, when the non-conversion region TR of the wavelength conversion module 130 enters the irradiation range of the laser beam 50, the laser beam 50 passes through the wavelength conversion module 130 and is transmitted to the polarizing rotation module 120 via the light transmission module LT and then transmitted to a light valve 410a. On the other hand, in the present embodiment, when the at least one wavelength conversion region WR enters the irradiation range of the laser beam 50, the laser beam 50 is converted into at least one wavelength conversion beam 60 by the at least one wavelength conversion region WR. Afterwards, as shown in FIG. 3, the at least one wavelength conversion beam 60 from the wavelength conversion module 130 can be guided to the first dichroic element DM1 and reflected to a light valve 410b. When the at least one wavelength conversion beam 60 of the wavelength conversion module 130 is transmitted to the light valve 410b, the auxiliary light source AL is turned on, so that the auxiliary beam 50R is transmitted to the other light valve 410a. In other words, the laser beam 50, the auxiliary beam 50R, and the at least one wavelength conversion beam 60 form the illumination beam 70 of the illumination system 300.

Similar to the projection device 200, the laser beam 50 passes through the non-conversion region TR of the wavelength conversion module 130 in different time periods to be transmitted to the polarizing rotation module 120 via the light transmission module LT. Therefore, the at least one laser beam 50 passes through the polarizing element 123 at a specific frequency in a plurality of first time periods TI1, and the first time periods TI1 are separated from each other by a plurality of first time intervals TD1. On the other hand, the auxiliary light source AL also provides the auxiliary beam 50R at the specific frequency in a plurality of second time periods 112, and the second time periods 112 are separated from each other by a plurality of second time intervals TD2. The second time interval TD2 is the time length of the first time period TI1, and the first time interval TD1 is the time length of the second time period TI2. Accordingly, the second time periods 112 and the first time periods TI1 do not temporally overlap with each other. Moreover, the illumination system 300 may cause the light valves 410a and 410b to form intervals of the image beam 80 having different colors as shown in FIG. 4 in different time periods by adjusting the time lengths of the first time periods TI1 and the second time periods TI2. Therefore, the relative ratio relationships between the first revolution frequency of the first axle 121 of the polarizing rotation module 120 and the specific frequency and the frame rate of the light valves 410a and 410b may also be configured to be identical to those of the optical elements in the projection device 200 of FIG. 1.

Accordingly, in the present embodiment, in the projection device 400 and the illumination system 300, by similarly setting the relative relationships between the first revolution frequency of the first axle 121 of the polarizing rotation module 120 and the specific frequency and the frame rate of the light valves 410a and 410b, the laser beam 50 and the auxiliary beam 50R can be incident on the non-specific corresponding regions of the polarizing element 123 to fully cover the polarizing directions as much as possible. Accordingly, the present embodiment can generate an image with uniform the polarizing direction. In this way, even in the case where the projection beams 90 provided by two projection devices 400 pass through the polarizing plate in the front, an image having uniform coloration and brightness can be generated to allow the user to observe a 3D display image having improved uniformity through polarized 3D glasses.

Figure 5:
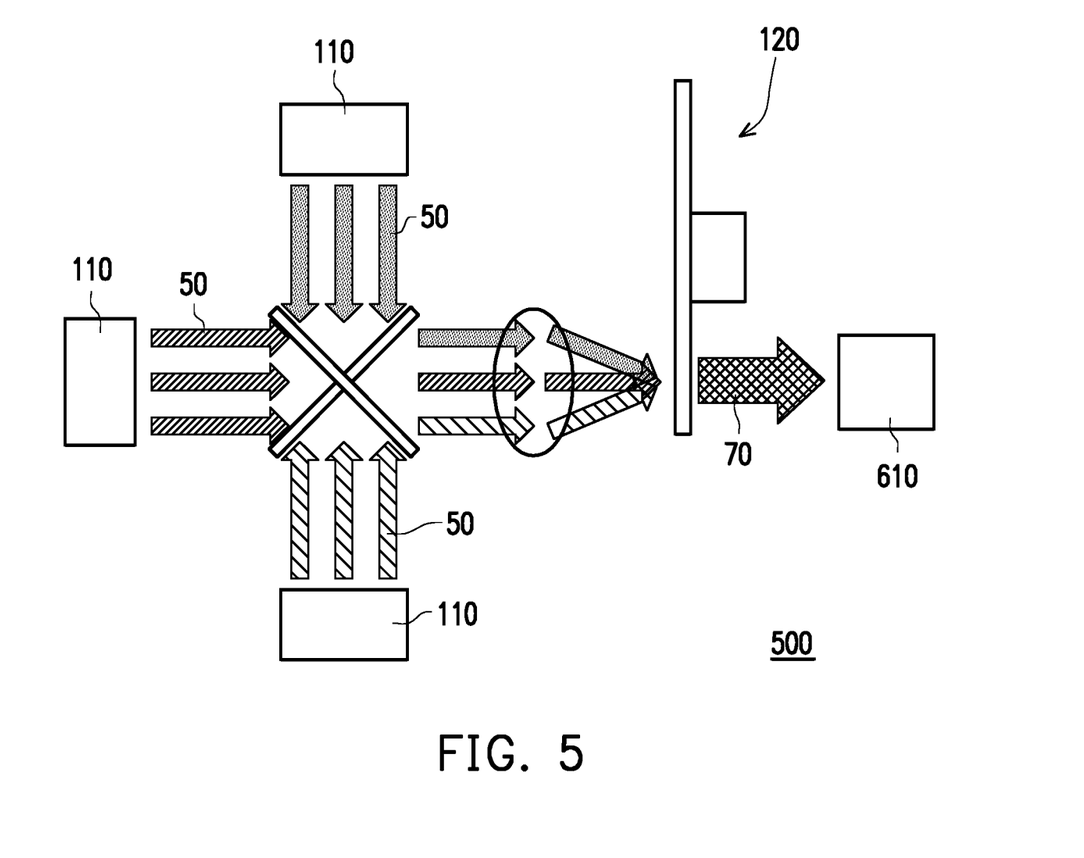
FIG. 5 is a schematic framework diagram illustrating another illumination system according to an embodiment of the invention.
Figure 6A:
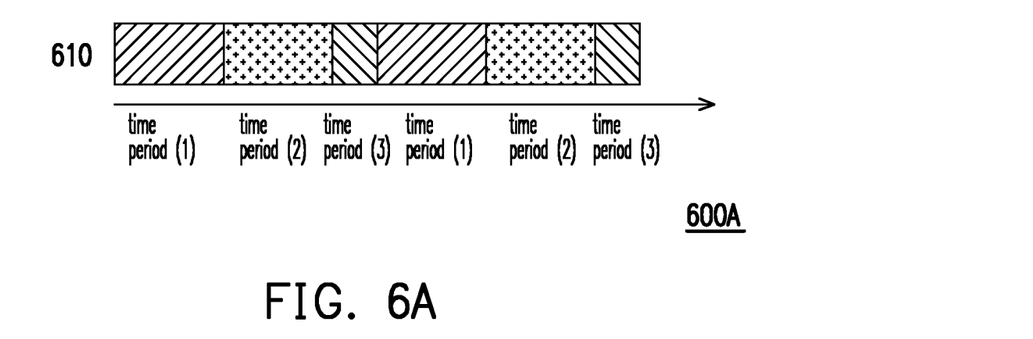
FIG. 6A and FIG. 6B are schematic time sequence diagrams of the illumination beam of the light valve when the illumination system of FIG. 5 is applied to different projection devices.
Figure 6B:
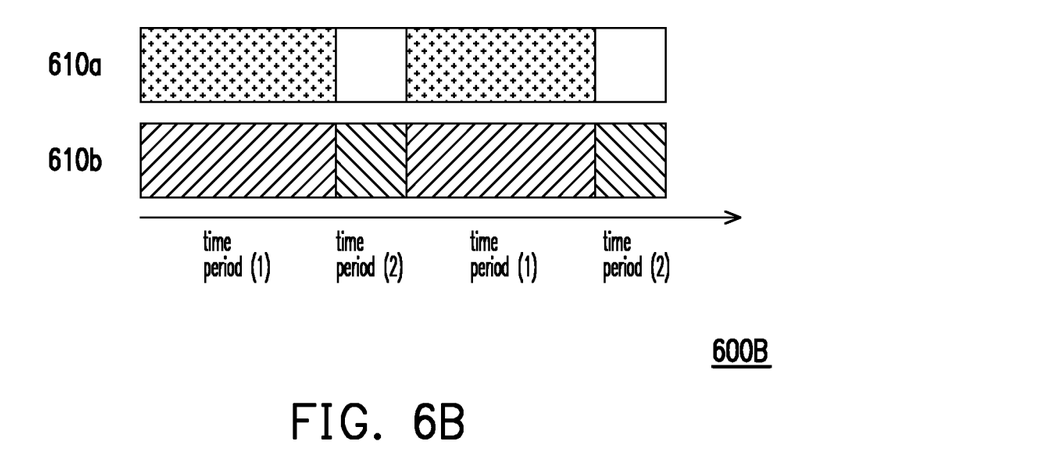

FIG. 5 is a schematic framework diagram illustrating another illumination system according to an embodiment of the invention. FIG. 6A and FIG. 6B are schematic time sequence diagrams of the illumination beam of the light valve when the illumination system of FIG. 5 is applied to different projection devices. Referring to FIG. 5, an illumination system 500 of the present embodiment is similar to the illumination system 100 of FIG. 1 or the illumination system 300 of FIG. 3, and the difference therebetween is as described below. In the present embodiment, the illumination system 500 is, for example, an illumination system that uses three laser light sources 110. Therefore, the configuration of the auxiliary light source AL, the filtering module 140, and the wavelength conversion module 130 may be omitted. As shown in FIG. 5 to FIG. 6B, in the present embodiment, the laser light sources 110 may be turned on at a specific frequency in different time periods and may form different projection devices 600A and 600B using different numbers of light valves.

For example, as shown in FIG. 5 and FIG. 6A, in the present embodiment, when the projection device 600A uses one single digital micro-mirror device (1-DMD) as a light valve 610, the laser light sources 110 of the illumination system 500 may be turned on one after another at the specific frequency in different time periods, and the on-periods of the laser light sources 110 do not overlap with each other. After passing through the polarizing rotation module 120, the laser beams 50 provided by the laser light sources 110 form the illumination beam 70 transmitted to the light valve 610.

On the other hand, as shown in FIG. 5 and FIG. 6B, in the present embodiment, when the projection device 600B uses two digital micro-mirror devices (2-DMD) as light valves 610a and 610b, one of the laser light sources 110 of the illumination system 500 is turned on and off at the specific frequency in one of the time periods, and the laser beam 50 it provides is transmitted to one of the light valves (i.e., the light valve 610a) of the projection device 600B. The other two laser light sources 110 are turned on one after the other at the specific frequency in different time periods, and the laser beams 50 they provide are transmitted one after the other to the other light valve (i.e., the light valve 610b) of the projection device 600B. In other words, after passing through the polarizing rotation module 120, the laser beams 50 provided by the laser light sources 110 form the illumination beam 70 transmitted to the light valves 610a and 610b.

Similarly, in the present embodiment, the first revolution frequency of the first axle 121 of the polarizing rotation module 120 and the specific frequency in the illumination system 500 shall be determined according to the frame rate of the light valves 610, 610a, and 610b in the projection devices 600A and 600B to which the illumination system 500 is applied. The relative ratio relationships between the first revolution frequency of the first axle 121 of the polarizing rotation module 120 and the specific frequency and the frame rate of the light valves 610, 610a, and 610b in the projection devices 600A and 600B may be configured to be identical to those of the optical elements in the projection device 200 of FIG. 1. Therefore, when the illumination system 500 is applied to the projection devices 600A and 600B, the projection devices 600A and 600B can exhibit the advantages of the projection device 200 mentioned above, which shall not be repeatedly described here.

Figure 7:
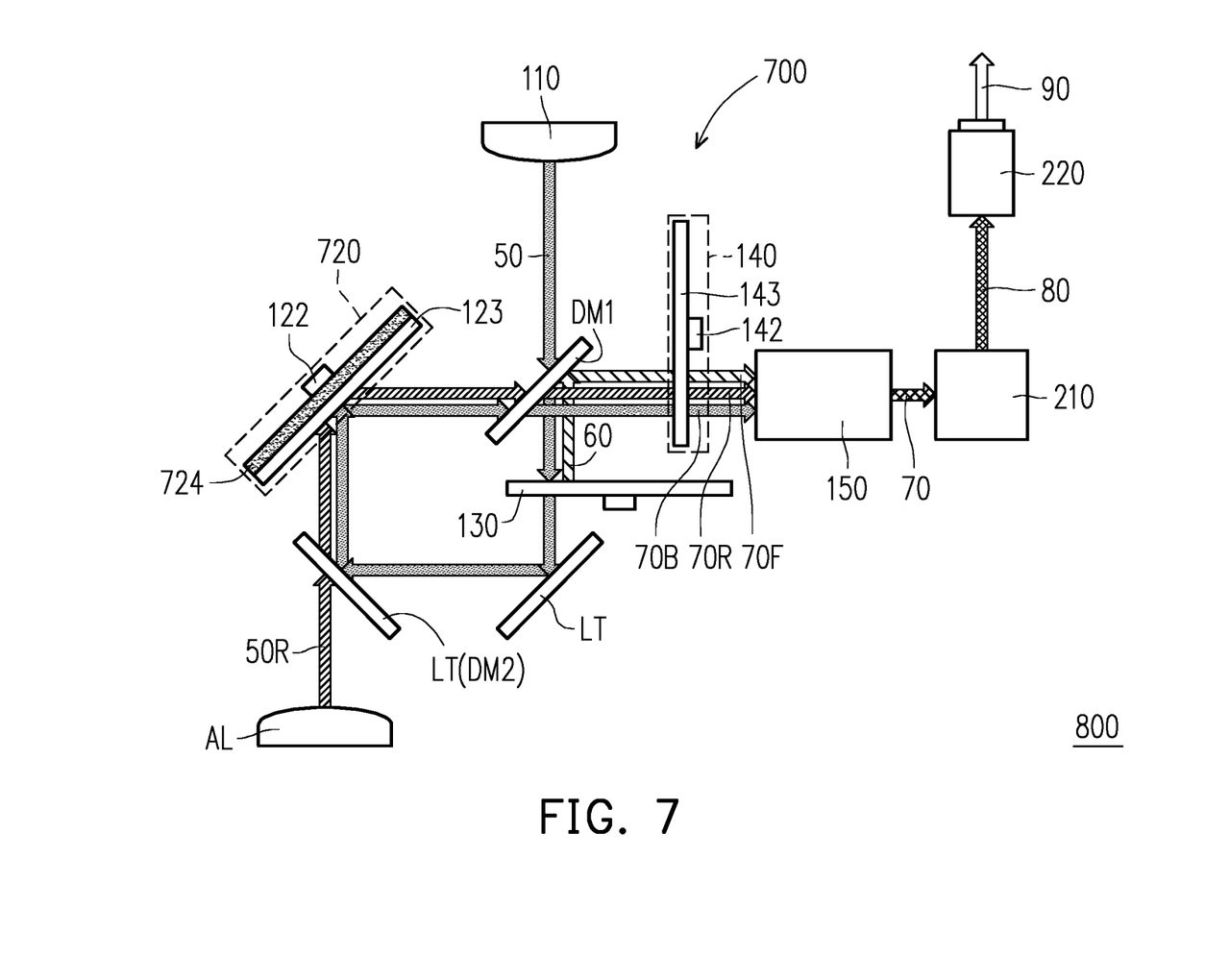
FIG. 7 is a schematic framework diagram illustrating another projection device according to an embodiment of the invention.

FIG. 7 is a schematic framework diagram illustrating another projection device according to an embodiment of the invention. Referring to FIG. 7, an illumination system 700 and a projection device 800 of the present embodiment are similar to the illumination system 100 and the projection device 200 of FIG. 1, and the difference therebetween is as described below. In the present embodiment, a polarizing rotation module 720 of the projection device 800 and the illumination system 700 further includes a reflecting element 724. In other words, in the present embodiment, the polarizing rotation module 720 is a reflective polarizing rotation module, and the polarizing rotation module 120 of FIG. 1 is a transmissive polarizing rotation module.

Specifically, as shown in FIG. 7, in the present embodiment, the reflecting element 724 of the polarizing rotation module 720 is located on one side of the polarizing element 123, and the other side of the polarizing element 123 faces the laser beam 50 and the auxiliary beam 50R from the second dichroic element DM2 of the light transmission module LT. Therefore, after being transmitted to the polarizing rotation module 720 via the light transmission module LT, the laser beam 50 and the auxiliary beam 50R can then pass through the polarizing element 123 of the polarizing rotation module 720 and be reflected to the first dichroic element DM1 via the reflecting element 724 of the polarizing rotation module 720.

Accordingly, in the present embodiment, in the projection device 800 and the illumination system 700, by similarly setting the relative relationships between the first revolution frequency of the first axle 121 of the polarizing rotation module 720 and the specific frequency and the frame rate of the light valve 210, the laser beam 50 and the auxiliary beam 50R can be incident on the non-specific corresponding regions of the polarizing element 123 to fully cover the polarizing directions as much as possible. As a result, the present embodiment can generate an image with uniform the polarizing direction. In this way, even in the case where the projection beams 90 provided by two projection devices 800 pass through the polarizing plate in the front, an image having uniform coloration and brightness can be generated to allow the user to observe a 3D display image having improved uniformity through polarized 3D glasses. Therefore, the illumination system 700 and the projection device 800 can exhibit the advantages of the illumination system 100 and the projection device 200 mentioned above, which shall not be repeatedly described here.

In summary of the above, the embodiments of the invention at least exhibit one of the advantages or effects below. In the embodiments of the invention, in the projection device, by setting the relative relationships between the first revolution frequency of the first axle of the polarizing rotation module and the specific frequency, the second revolution frequency of the second axle of the filtering module, and the frame rate of the light valve, the laser beam and the auxiliary beam can be incident on the non-specific corresponding regions of the polarizing element to fully cover the polarizing directions as much as possible. As a result, the invention can generate an image with uniform the polarizing direction. In this way, even in the case where the projection beams provided by two projection devices pass through the polarizing plate in the front, an image having uniform coloration and brightness can be generated to allow the user to observe a 3D display image having improved uniformity through polarized 3D glasses.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, configured to provide an illumination beam, the illumination system comprising at least one laser light source and a polarizing rotation module, wherein the at least one laser light source is configured to provide at least one laser beam, and the polarizing rotation module comprises a first axle, a first driving element, and a polarizing element, wherein
the first axle has a first revolution frequency,
the first driving element is configured to drive the first axle to rotate, and
the polarizing element is connected to the first axle and is disposed on a transmission path of the at least one laser beam, wherein the first driving element is configured to cause the polarizing element to rotate in a temporally sequenced manner with the first axle as a rotation central axis, and when the polarizing element is rotated, the at least one laser beam is transmitted to the polarizing element at a specific frequency in a plurality of first time periods, wherein the first time periods are separated from each other by a plurality of first time intervals, the at least one laser beam passing through the polarizing element has different polarizing states at different times, and the specific frequency and the first revolution frequency of the first axle are not exactly divisible by each other.

2. The illumination system according to claim 1, wherein a half of the specific frequency does not exactly divide the first revolution frequency of the first axle, or a half of the first revolution frequency of the first axle does not exactly divide the specific frequency.

3. The illumination system according to claim 1, wherein the first revolution frequency is greater than or equal to 30 Hz.

4. The illumination system according to claim 3, wherein the first revolution frequency is greater than or equal to 60 Hz.

5. The illumination system according to claim 1, wherein a first difference is present between the specific frequency and the first revolution frequency, and the first difference is greater than or equal to 10 Hz.

6. The illumination system according to claim 1, further comprising:
a filtering module comprising a second axle, a second driving element, and a filtering substrate, wherein
the second axle has a second revolution frequency,
the second driving element is configured to drive the second axle to rotate, and
the filtering substrate is connected to the second axle and is disposed on the transmission path of the at least one laser beam, wherein the second driving element is configured to cause the filtering substrate to rotate in a temporally sequenced manner with the second axle as a rotation central axis, and the first revolution frequency of the first axle of the polarizing rotation module and the second revolution frequency of the second axle of the filtering module are not exactly divisible by each other.

7. The illumination system according to claim 6, wherein a half of the second revolution frequency does not exactly divide the first revolution frequency, or a half of the first revolution frequency does not exactly divide the second revolution frequency.

8. The illumination system according to claim 6, wherein a second difference is present between the first revolution frequency and the second revolution frequency, and the second difference is greater than or equal to 10 Hz.

9. The illumination system according to claim 6, wherein the filtering module comprises at least one filtering region located on the filtering substrate, and one of the filtering region of the filtering module corresponds to at least one polarizing sub-region of the polarizing element, wherein when the polarizing element and the filtering substrate are rotated, the at least one laser beam passing through the at least one polarizing sub-region of the polarizing element is transmitted to the corresponding filtering region, and an angle ratio occupied by the at least one polarizing sub-region on the polarizing element is greater than 20%.

10. The illumination system according to claim 1, wherein the polarizing element is a half-wave plate, a quarter-wave plate, a depolarizing plate, or a circular polarizing plate.

11. The illumination system according to claim 1, further comprising:
an auxiliary light source, providing an auxiliary beam, wherein the polarizing rotation module is located on a transmission path of the auxiliary beam, the auxiliary light source provides the auxiliary beam at the specific frequency in a plurality of second time periods, and the plurality of second time periods are separated from each other by a plurality of second time intervals.

12. A projection device comprising an illumination system, at least one light valve, and a projection lens, wherein
the illumination system is configured to provide an illumination beam, and the illumination system comprises at least one laser light source and a polarizing rotation module, wherein
the at least one laser light source is configured to provide at least one laser beam, and
the polarizing rotation module comprises a first axle, a first driving element, and a polarizing element, wherein the first axle has a first revolution frequency, the first driving element is configured to drive the first axle to rotate, and the polarizing element is connected to the first axle and is disposed on a transmission path of the at least one laser beam, wherein the first driving element is configured to cause the polarizing element to rotate in a temporally sequenced manner with the first axle as a rotation central axis, and when the polarizing element is rotated, the at least one laser beam is transmitted to the polarizing element at a specific frequency in a plurality of first time periods, wherein the first time periods are separated from each other by a plurality of first time intervals, the at least one laser beam passing through the polarizing element has different polarizing states at different times, and the specific frequency and the first revolution frequency of the first axle are not exactly divisible by each other,
the at least one light valve is disposed on a transmission path of the illumination beam and is configured to convert the illumination beam into an image beam, and
the projection lens is disposed on a transmission path of the image beam and is configured to convert the image beam into a projection beam.

13. The projection device according to claim 12, wherein a half of the specific frequency does not exactly divide the first revolution frequency of the first axle, or a half of the first revolution frequency of the first axle does not exactly divide the specific frequency.

14. The projection device according to claim 12, wherein the first revolution frequency is greater than or equal to 30 Hz.

15. The projection device according to claim 14, wherein the first revolution frequency is greater than or equal to 60 Hz.

16. The projection device according to claim 12, wherein a first difference is present between the specific frequency and the first revolution frequency, and the first difference is greater than or equal to 10 Hz.

17. The projection device according to claim 12, wherein the illumination system further comprises a filtering module, wherein the filtering module comprises a second axle, a second driving element, and a filtering substrate, the second axle has a second revolution frequency, the second driving element is configured to drive the second axle to rotate, and the filtering substrate is connected to the second axle and is disposed on the transmission path of the at least one laser beam, wherein the second driving element is configured to cause the filtering substrate to rotate in a temporally sequenced manner with the second axle as a rotation central axis, and the first revolution frequency of the first axle of the polarizing rotation module and the second revolution frequency of the second axle of the filtering module are not exactly divisible by each other.

18. The projection device according to claim 17, wherein a half of the second revolution frequency does not exactly divide the first revolution frequency, or a half of the first revolution frequency does not exactly divide the second revolution frequency.

19. The projection device according to claim 17, wherein a second difference is present between the first revolution frequency and the second revolution frequency, and the second difference is greater than or equal to 10 Hz.

20. The projection device according to claim 17, wherein the filtering module comprises at least one filtering region located on the filtering substrate, and one of the filtering region of the filtering module corresponds to at least one polarizing sub-region of the polarizing element, wherein when the polarizing element and the filtering substrate are rotated, the at least one laser beam passing through the at least one polarizing sub-region of the polarizing element is transmitted to the corresponding filtering region, and an angle ratio occupied by the at least one polarizing sub-region on the polarizing element is greater than 20%.

21. The projection device according to claim 12, wherein the polarizing element is a half-wave plate, a quarter-wave plate, a depolarizing plate, or a circular polarizing plate.

22. The projection device according to claim 12, wherein the illumination system further comprises an auxiliary light source providing an auxiliary beam, wherein the polarizing rotation module is located on a transmission path of the auxiliary beam, the auxiliary light source provides the auxiliary beam at the specific frequency in a plurality of second time periods, and the plurality of second time periods are separated from each other by a plurality of second time intervals.

23. An illumination system configured to provide an illumination beam, the illumination system comprising at least one laser light source, a polarizing rotation module, and a filtering module, wherein
 the at least one laser light source is configured to provide at least one laser beam,
 the polarizing rotation module comprises a first axle, a first driving element, and a polarizing element, wherein the first axle has a first revolution frequency,
 the first driving element is configured to drive the first axle to rotate, and
 the polarizing element is connected to the first axle and is disposed on a transmission path of the at least one laser beam, wherein the first driving element is configured to cause the polarizing element to rotate in a temporally sequenced manner with the first axle as a rotation central axis, and
 the filtering module comprises a second axle, a second driving element, and a filtering substrate, wherein
 the second axle has a second revolution frequency,
 the second driving element is configured to drive the second axle to rotate, and
 the filtering substrate is connected to the second axle and is disposed on the transmission path of the at least one laser beam, wherein the second driving element is configured to cause the filtering substrate to rotate in a temporally sequenced manner with the second axle as a rotation central axis, and the first revolution frequency of the first axle of the polarizing rotation module and the second revolution frequency of the second axle of the filtering module are not exactly divisible by each other.

24. The illumination system according to claim 23, wherein a half of the second revolution frequency does not exactly divide the first revolution frequency, or a half of the first revolution frequency does not exactly divide the second revolution frequency.

25. The illumination system according to claim 23, wherein a difference is present between the first revolution frequency and the second revolution frequency, and the difference is greater than or equal to 10 Hz.

26. The illumination system according to claim 23, wherein the filtering module comprises at least one filtering region located on the filtering substrate, and one of the filtering region of the filtering module corresponds to at least one polarizing sub-region of the polarizing element, wherein when the polarizing element and the filtering substrate are rotated, the at least one laser beam passing through the at least one polarizing sub-region of the polarizing element is transmitted to the corresponding filtering region, and an angle ratio occupied by the at least one polarizing sub-region on the polarizing element is greater than 20%.

\* \* \* \* \*